United States Patent
Vergara Lopez et al.

(10) Patent No.: US 12,166,389 B1
(45) Date of Patent: Dec. 10, 2024

(54) CENTRIFUGAL MAGNETIC FLUX ADJUSTER ELECTRICAL MOTOR

(71) Applicant: Schaeffler Technologies AG & Co. KG, Herzogenaurach (DE)

(72) Inventors: Mauricio Vergara Lopez, San Pedro Cholula (MX); Antonio Cortes Ramirez, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 7 days.

(21) Appl. No.: 18/206,150

(22) Filed: Jun. 6, 2023

(51) Int. Cl.
*H02K 1/276* (2022.01)
*H02K 21/02* (2006.01)

(52) U.S. Cl.
CPC .................. *H02K 21/029* (2013.01)

(58) Field of Classification Search
CPC ...... H02K 1/274; H02K 1/2753; H02K 1/276; H02K 21/021; H02K 21/028; H02K 21/029
See application file for complete search history.

(56) References Cited

U.S. PATENT DOCUMENTS

| 2013/0154397 | A1* | 6/2013 | Sullivan | H02K 21/22 310/68 B |
| 2019/0157946 | A1* | 5/2019 | Andersson | H02K 1/12 |
| 2019/0207446 | A1* | 7/2019 | Swales | H02K 16/02 |
| 2021/0376705 | A1* | 12/2021 | Orbay | H02K 1/2766 |

FOREIGN PATENT DOCUMENTS

| CN | 105978197 A | * | 9/2016 | |
| CN | 106558933 A | * | 4/2017 | ............. H02K 1/276 |
| CN | 106664001 A | * | 5/2017 | ........... H02K 1/2773 |
| CN | 108933486 A | * | 12/2018 | ............... H02K 1/02 |
| CN | 110212725 A | * | 9/2019 | |
| CN | 110445272 A | * | 11/2019 | ............. B60L 50/50 |
| WO | WO-2016000697 A1 | * | 1/2016 | ........... H02K 1/2773 |

* cited by examiner

*Primary Examiner* — Ramon M Barrera
(74) *Attorney, Agent, or Firm* — Volpe Koenig

(57) ABSTRACT

An electric motor including a stator, and a rotor supported for rotation within the stator. The rotor includes a plurality of circumferentially spaced-apart radially outer permanent magnets fixed to the rotor and a plurality of circumferentially spaced-apart radially inner permanent magnets movably supported by the rotor. The radially inner permanent magnets are movable radially with respect to the rotor between a first radially inner position and a second radially outer position to weaken the magnetic field of the radially outer permanent magnets at higher speeds.

20 Claims, 2 Drawing Sheets

CENTRIFUGAL MAGNETIC FLUX ADJUSTER ELECTRICAL MOTOR

FIELD

The present disclosure relates generally to electric motors. More particularly, the present disclosure relates to an electric motor with a magnetic flux adjuster.

BACKGROUND

Electric motors are well-known. One type of electric motor is a permanent magnet synchronous motor (PMSM). In such motors, magnets are supported on a rotor of the motor. The rotor is supported for rotation inside windings of a stator. The motor operates through the interaction between the magnetic fields of the magnets of the rotor and electrical current in conductors of the windings to generate force in the form of torque applied on an output shaft of the motor connected to the rotor. This torque is developed by the interaction of electromagnetic fields of the conductors of the windings carrying current in a direction at right angles to the magnetic fields of the magnets.

For a PMSM to rotate, the stator must produce a magnetic field that attracts the rotor's magnets, producing a rotation. Torque is maximum when the angle separating the stator field vector and the rotor field vector=90°. If this angle=0°, no rotation is produced. The stator field vector must rotate through the stator to prevent the rotor field vector from aligning with the stator field, which would stop rotation.

Electric current in the stator can be applied in two axes (direct and quadrature) to produce the stator field vector. In three phase motors, current is applied in all three phases (A,B,C) to produce the desired stator field.

In order to program the motor controller, the Clarke/Park transform is used to obtain the corresponding Iq and Id (Quadratic current and Direct Current, respectively). Iq is at 90° from the rotor field. Id is aligned (0°) with the rotor field.

Back EMF (BEMF), also referred to as counter-electromotive force, is a well-known phenomenon of electric motors. In a PMSM, back EMF increases linearly with the rate of rotation of the motor and acts against the applied voltage that is causing the motor to spin. This reduces the current the current flowing through the coils and ultimately limits the maximum speed of the motor.

Various approaches are used to counter BEMF. One approach is to inject direct current at higher motor speeds to counteract the effects of BEMF. Id applied to the stator's field produces a magnetic field in opposite direction of the rotor's field. Like poles repel each other, therefore "weakening" the rotor's magnetic field. With a weaker field, BEMF (opposing rotating force) is reduced, allowing the machine to increase speed. Applying Id to increase speed is inefficient.

SUMMARY

In accordance with one aspect of the present disclosure, an electric motor comprises a stator, and a rotor supported for rotation within the stator. The rotor includes a plurality of circumferentially spaced-apart radially outer permanent magnets fixed to the rotor and a plurality of circumferentially spaced-apart radially inner permanent magnets movably supported by the rotor. The radially inner permanent magnets are movable radially between a first radially inner position and a second radially outer position, the first radially inner position being spaced further from the radially outer permanent magnets than the second radially outer position.

Each of the inner permanent magnets can be supported in a radial slot of the rotor. Each of the inner permanent magnets can be biased towards the first radially inner position with a biasing member. The biasing member can include a spring. At least one of a surface of the radially inner permanent magnets or a surface of the rotor can be polished. At least one of a surface of the radially inner permanent magnets or a surface of the rotor can include a coating for reducing friction. For each of the plurality of radially outer magnets, a corresponding one of the plurality of radially inner magnets can be aligned along a common radial direction, with aligned radially outer magnets and radially inner magnets defining a magnet pair. The magnets of each magnet pair can be oriented with like poles adjacent to each other. The rotor can include a magnetic isolator adjacent the plurality of radially inner permanent magnets.

In accordance with another aspect, a rotor for an electric motor comprises a plurality of circumferentially spaced-apart radially outer permanent magnets fixed to the rotor and a plurality of circumferentially spaced-apart radially inner permanent magnets movably supported by the rotor. The radially inner permanent magnets are movable radially between a first radially inner position and a second radially outer position, the first radially inner position being spaced further from the radially outer permanent magnets than the second radially outer position.

Each of the inner permanent magnets can be biased towards the first radially inner position with a biasing member. The biasing member can include a spring. At least one of a surface of the radially inner permanent magnets or a surface of the rotor can be polished. At least one of a surface of the radially. For each of the plurality of radially outer magnets, a corresponding one of the plurality of radially inner magnets is aligned along a common radial direction, with aligned radially outer magnets and radially inner magnets defining a magnet pair. Magnets of each magnet pair can be oriented with like poles adjacent to each other. The rotor can include a magnetic isolator adjacent the plurality of radially inner permanent magnets.

In accordance with another aspect, a method for reducing back electromotive force in a permanent magnet electric motor comprises providing rotor of the electric motor with a plurality of circumferentially spaced-apart radially outer permanent magnets fixed to the rotor and a plurality of circumferentially spaced-apart radially inner permanent magnets movably supported by the rotor, the radially inner permanent magnets are movable radially between a first radially inner position and a second radially outer position, the first radially inner position being spaced further from the radially outer permanent magnets than the second radially outer position, and reducing a magnetic field of permanent magnets of rotor of the electric motor based at least in part on a rate of rotation of the rotor. Reducing the magnetic field of the permanent magnets includes moving the inner permanent magnets radially outwardly from the first position to the second position.

For each of the plurality of radially outer magnets, a corresponding one of the plurality of radially inner magnets can be aligned along a common radial direction, aligned radially outer magnets and radially inner magnets defining a magnet pair. The method can further include biasing the radially inner magnets towards the first position.

Additional embodiments are disclosed herein.

BRIEF DESCRIPTION OF THE DRAWINGS

The foregoing Summary and the following Detailed Description will be better understood when read in conjunction with the appended drawings, which illustrate an embodiment of the disclosure. In the drawings.

DETAILED DESCRIPTION

Figure 1:
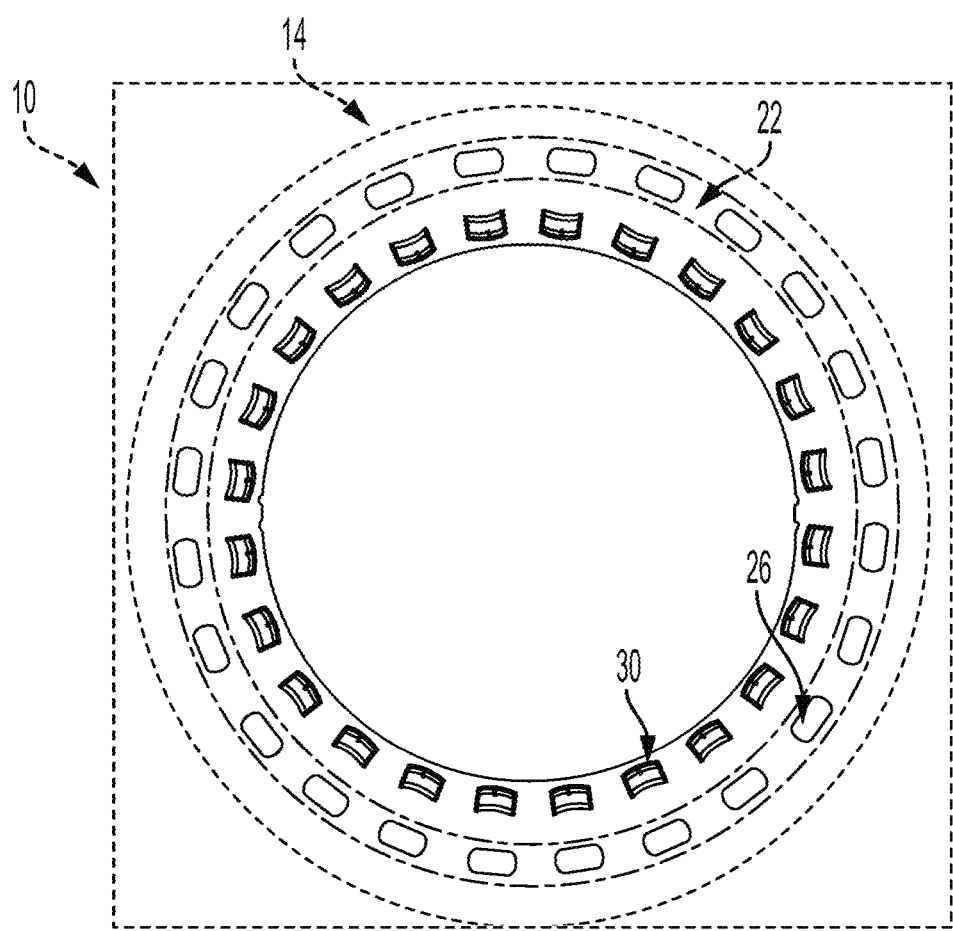
FIG. 1 is a schematic illustration of an exemplary electric motor in accordance with the present disclosure.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

Referring to FIG. 1, an exemplary electric motor is schematically illustrated and identified generally by reference numeral 10. The electric motor 10 of the exemplary embodiment is a permanent magnet electric motor including a stator 14 having a plurality of windings (not shown) and a rotor 22 positioned inside the stator 14 having a plurality of circumferentially spaced-apart primary permanent magnets 26. The windings of the stator 14 and the primary magnets 26 are configured to function in typical fashion with the windings generating an electromagnetic field at approximately 90 degrees to the magnetic field of the primary magnets 26 to develop torque. The primary permanent magnets 26 can be single magnets or pairs of magnets, or any other configuration of magnets as aspects of the present disclosure can be used in connection with a wide range of rotor magnet configurations. It should be appreciated that the electric motor 10 includes various other components not shown in the drawings such as a rotor shaft, housing, etc.

Figure 3:
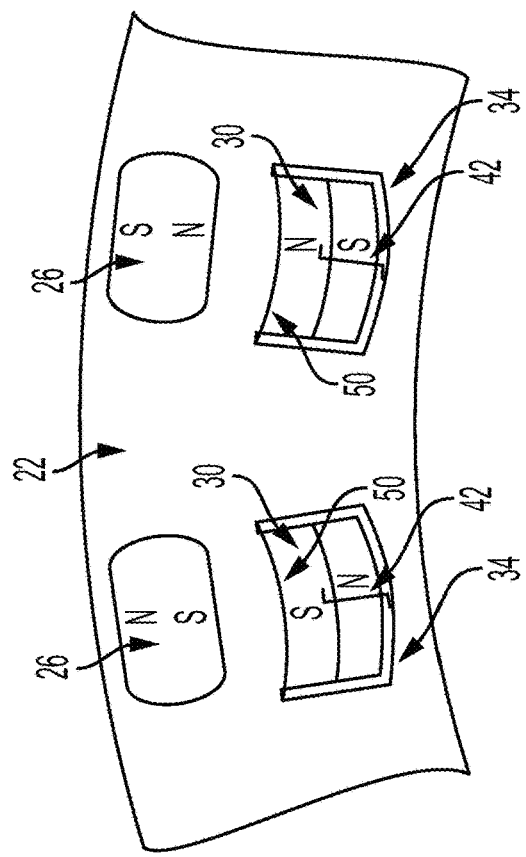
FIG. 3 is an enlarged portion of FIG. 1 showing magnets of the rotor in a second position.
Figure 2:
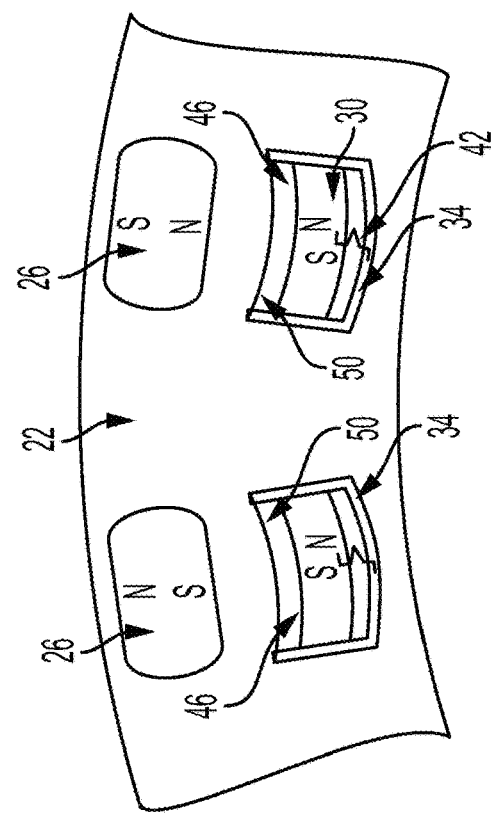
FIG. 2 is an enlarged portion of FIG. 1 showing magnets of the rotor in a first position.

In accordance with the present disclosure, and with additional reference to FIGS. 2 and 3, the rotor 22 also includes a second set of permanent magnets, hereinafter referred to as centrifugal magnets 30, supported for limited radial movement towards and away from the primary magnets 26 within slots 34 or guides of the rotor 22. The slots 34 support each centrifugal magnet for sliding movement in a radial direction between a first radially inner position shown in FIG. 2 and a second radially outer position shown in FIG. 3. Movement of the centrifugal magnets 30 is based at least in part on a rotational speed of the rotor 22. As rotor speed increases and correspondingly BEMF increases, the centrifugal magnets 30 are configured to move radially outwardly to a position closer to the primary permanent magnets 26.

The centrifugal magnets 30 are equal in quantity to the primary magnets 26, with each centrifugal magnet 30 positioned along a common radius with a corresponding primary magnet 26. In some embodiments, the centrifugal magnets 30 can be less than or greater in number than the quantity of primary magnets 26. In the illustrated exemplary embodiment, the centrifugal magnets 30 are attached to the rotor 22 with biasing members in the form of springs 42. The springs 42 bias the centrifugal magnets towards the radially inner position of FIG. 2. Accordingly, in FIG. 2, an air gap 46 exists between a radially outer surface of each centrifugal magnet 34 and a radially outer end wall 50 of the slot 34 when the rotor 22 is at rest or rotating below a threshold speed. The spring coefficient and the strength of the centrifugal magnets 30 can be selected such that when the rotor rational speed reaches the corner speed point, the centrifugal force acting on the centrifugal magnets 30 is strong enough to displace the centrifugal magnets 30 radially outwardly towards the radially outer end wall 50 of the slots 34 to the position shown in FIG. 3. The corner speed point a characteristic of every conventional electric motor and specifies the speed corresponding to the last working point of the constant torque zone of the torque vs speed curve. Past this point in a conventional motor, more and more Iq current is used to fight BEMF, making the speeds higher that the corner speed point inefficient. It will be appreciated that motor speed and/or radial position of the magnets along with the spring coefficient can be considered to achieve a desired displacement of the centrifugal magnets 30 for a given application.

The centrifugal magnets 30 are installed in an opposed orientation relative to the orientation of the primary magnets 26. That is, if a primary magnet's north pole N is facing the outer diameter of the rotor 22, its corresponding centrifugal magnet 30 shall have its south pole S facing the outer diameter of the rotor 22, and vice versa. As the centrifugal magnets move from the first radially inner position of FIG. 2 to the second radially outer position of FIG. 3, the distance between the primary magnets 26 and the centrifugal magnets 30 is reduced thereby weakening the magnetic field of the primary magnets 26. The weakening of the magnetic field of the primary magnets 26 reduces the BEMF generated by the electric motor 10 which prevents it from reaching higher speeds. The weakening of the magnetic field is only present at higher rotor RPMs when BEMF otherwise would be at its greatest. Thus, aspects of the present disclosure can reduce the amount of current used to fight BEMF at high rotor speed, thereby increasing the efficiency of the motor 10.

The surfaces of the centrifugal magnets surface 30 and corresponding surfaces of the slots 34 can be polished and/or coated to reduce friction therebetween and to ensure smooth radial displacement between the first and second positions. The slots 34, and in particular, bottom portions thereof (e.g., radially inner portions), can be provided with a magnetic isolator to prevent any unwanted interactions of the centrifugal magnets 30 with the shaft, rotor or other components of the motor 10.

Having thus described the present disclosure in detail, it is to be appreciated and will be apparent to those skilled in the art that many physical changes, only a few of which are exemplified in the detailed description of the invention, could be made without altering the concepts and principles embodied therein.

It is also to be appreciated that numerous embodiments incorporating only part of an embodiment are possible which do not alter, with respect to those parts, the concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 electric motor
14 stator
22 rotor
26 primary permanent magnets
30 centrifugal magnets
34 slot
42 spring
46 air gap
50 end wall

The invention claimed is:

1. An electric motor comprising:
a stator; and
a rotor supported for rotation within the stator;
wherein the rotor includes a plurality of circumferentially spaced-apart radially outer permanent magnets fixed to the rotor and a plurality of circumferentially spaced-apart radially inner permanent magnets movably supported by the rotor;
wherein the radially inner permanent magnets are movable radially between a first radially inner position and a second radially outer position, the first radially inner position being spaced further from the radially outer permanent magnets than the second radially outer position.

2. The electric motor according to claim 1, wherein each of the inner permanent magnets are supported in a radial slot of the rotor.

3. The electric motor according to claim 1, wherein each of the inner permanent magnets are biased towards the first radially inner position with a biasing member.

4. The electric motor according to claim 3, wherein the biasing member includes a spring.

5. The electric motor according to claim 1, wherein at least one of a surface of the radially inner permanent magnets or a surface of the rotor is polished.

6. The electric motor according to claim 1, wherein at least one of a surface of the radially inner permanent magnets or a surface of the rotor includes a coating for reducing friction.

7. The electric motor according to claim 1, wherein, for each of the plurality of radially outer magnets, a corresponding one of the plurality of radially inner magnets is aligned along a common radial direction, aligned radially outer magnets and radially inner magnets defining a magnet pair.

8. The electric motor according to claim 7, wherein the magnets of each magnet pair are oriented with like poles adjacent to each other.

9. The electric motor according to claim 1, wherein the rotor includes a magnetic isolator adjacent the plurality of radially inner permanent magnets.

10. A rotor for an electric motor comprising:
a plurality of circumferentially spaced-apart radially outer permanent magnets fixed to the rotor and a plurality of circumferentially spaced-apart radially inner permanent magnets movably supported by the rotor;
wherein the radially inner permanent magnets are movable radially between a first radially inner position and a second radially outer position, the first radially inner position being spaced further from the radially outer permanent magnets than the second radially outer position.

11. The rotor according to claim 10, wherein each of the inner permanent magnets are biased towards the first radially inner position with a biasing member.

12. The rotor according to claim 11, wherein the biasing member includes a spring.

13. The rotor according to claim 10, wherein at least one of a surface of the radially inner permanent magnets or a surface of the rotor is polished.

14. The rotor according to claim 10, wherein at least one of a surface of the radially inner permanent magnets or a surface of the rotor includes a coating for reducing friction.

15. The rotor according to claim 10, wherein, for each of the plurality of radially outer magnets, a corresponding one of the plurality of radially inner magnets is aligned along a common radial direction, aligned radially outer magnets and radially inner magnets defining a magnet pair.

16. The rotor according to claim 10, wherein the magnets of each magnet pair are oriented with like poles adjacent to each other.

17. The rotor according to claim 10, wherein the rotor includes a magnetic isolator adjacent the plurality of radially inner permanent magnets.

18. A method for reducing back electromotive force in a permanent magnet electric motor comprising:
providing rotor of the electric motor with a plurality of circumferentially spaced-apart radially outer permanent magnets fixed to the rotor and a plurality of circumferentially spaced-apart radially inner permanent magnets movably supported by the rotor;
wherein the radially inner permanent magnets are movable radially between a first radially inner position and a second radially outer position, the first radially inner position being spaced further from the radially outer permanent magnets than the second radially outer position; and
reducing a magnetic field of permanent magnets of rotor of the electric motor based at least in part on a rate of rotation of the rotor;
wherein reducing the magnetic field of the permanent magnets includes moving the inner permanent magnets radially outwardly from the first position to the second position.

19. The method of claim 18, wherein, for each of the plurality of radially outer magnets, a corresponding one of the plurality of radially inner magnets is aligned along a common radial direction, aligned radially outer magnets and radially inner magnets defining a magnet pair.

20. The method of claim 18, further comprising biasing the radially inner magnets towards the first position.

* * * * *